United States Patent [19]
Albertini et al.

[11] Patent Number: 5,642,336
[45] Date of Patent: *Jun. 24, 1997

[54] MAGNETIC WRITING HEAD FOR MAGNETO-OPTICAL RECORDING WITH THICK PROTECTIVE COATING

[75] Inventors: Jean Baptiste Albertini, Grenoble; Jean-Marc Fedeli, Beaucroissant, both of France

[73] Assignee: Commissariat a l'Energie Atomique, Paris, France

[*] Notice: The term of this patent shall not extend beyond the expiration date of Pat. No. 5,544,131.

[21] Appl. No.: 514,817

[22] Filed: Aug. 14, 1995

Related U.S. Application Data

[63] Continuation of Ser. No. 241,808, May 12, 1994, Pat. No. 5,544,131.

[30] Foreign Application Priority Data

May 14, 1993 [FR] France .................................. 93 05832

[51] Int. Cl.[6] .................................................. G11B 11/00
[52] U.S. Cl. ........................................ 369/13; 360/114
[58] Field of Search ............................. 369/13, 44.11, 369/44.14, 44.23, 44.26, 44.28, 44.39; 360/114, 59; 29/603; 365/122

[56] References Cited

U.S. PATENT DOCUMENTS

| | | | |
|---|---|---|---|
| 5,022,018 | 6/1991 | Vogelgesang | 369/13 |
| 5,124,961 | 6/1992 | Yamaguchi et al. | 369/13 |
| 5,317,800 | 6/1994 | Fedeli et al. | 360/114 X |
| 5,544,131 | 8/1996 | Albertini et al. | 369/13 |

*Primary Examiner*—Ali Neyzari
*Attorney, Agent, or Firm*—Oblon, Spivak, McClelland, Maier & Neustadt, P.C.

[57] ABSTRACT

Writing or overwriting magnetic head for magneto-optical recording. The head includes a silicon substrate (21) in which is buried a conductor coil (22). The coil (22) is set back with respect to the movement or flight plane (28) of the head. A magnetic circuit (24) can complete the head.

11 Claims, 8 Drawing Sheets

MAGNETIC WRITING HEAD FOR MAGNETO-OPTICAL RECORDING WITH THICK PROTECTIVE COATING

This is a continuation of application Ser. No. 08/241,808 filed on May 12, 1994 now U.S. Pat. No. 5,544,131.

BACKGROUND OF THE DESCRIPTION

1. Field of the Related Art

The present invention relates to a writing or overwriting magnetic head for magneto-optical recording.

2. Description of the Related Art

Magneto-optical recording should be subject to considerable growth in the next few years. Positioned between magnetic recording and optical memories, the magneto-optical process makes it possible to write and read at random binary data on a support. As a result of the high information densities stored on a removable or exchangeable disk, this procedure makes it possible to compete with hard computer disks and in particular floppy disks.

Although the performance characteristics as regards access or retrieval time of a magneto-optical device remain inferior to those of a hard magnetic disk (20 ms compared with approximately 8 ms for a hard disk), the advantages of the removability of the disk, the information storage stability (min 15 years and even 40 years as a function of the magneto-optical support type as compared with 2 to 3 years for a magnetic floppy disk) and the great information density (ISO standard 128 Mo for diameter 88 mm disks, or a density of approximately 16 kTPI and 13 kBPI, new standard in the course of definition roughly double the capacity of the ISO standard, more than 100 Mo for the Mini-Disc of 64 mm of SONY).

The fields of application of the invention are computer bulk memories (microprocessing, work stations and large systems), the storage of computer data on removable floppy disks (software, data bases, information filing) and general public audio/video applications (SONY Mini-Disc or future rerecordable video disks).

The magneto-optical recording method is derived from that of so-called compact optical disk readers. As in the case of the latter, it requires a laser diode, an optical head, a disk drive system and an electronics mainly of a logic nature. However, the optical head is more complex to produce, because the reading of the solely optical information calls on the detection of the rotation of the polarization plane of the reflected light (KERR effect) or transmitted light (FARADAY effect).

Most existing magneto-optical recorders operate in two stages for writing, namely an erase phase, during which a magnetic field of given direction is applied, followed by a write phase during which the magnetic field is reversed. The erase phase is necessary when it is not possible to sufficiently rapidly reverse the direction of the magnetic field. The direct overwrite process is expected to come into general use in the near future, because it avoids the prior erase phase and thus minimizes the writing time (total recording time divided by two).

At present there are two direct overwrite processes, namely laser beam modulation or LBM and magnetic field modulation or MFM. The first process requires specific disks (having several magnetic coatings), as well as a variation of the laser power between two levels, but it avoids having to vary the magnetic field. The second process, to which the present invention applies, makes it possible to write on the entire magneto-optical disk whilst very rapidly modifying the magnetic field (in less than a fraction of a microsecond, which corresponds to frequencies of several megahertz).

In order to be effective, the head ensuring the variation or modulation of the magnetic field must satisfy various criteria:

creation of an adequate magnetic field (approximately 20 mT) in the magneto-optical coating of the disk at the laser focusing point, limited inductance (approximately 1 µH) in order to permit a sufficiently rapid variation (square wave pulses of a fraction of a microsecond, or a fraction of a tenth of a microsecond, which is equivalent to frequencies of a few MHz to 50 MHz), compatibility with a removable disk, which can therefore carry dust, limited mass in order to ensure a minimum access time,
good heat dissipation.

The magnetic heads used at present in magneto-optical recorders for the modulation of the magnetic field (particularly for the SONY Mini-Disc) have a relatively large size (several mm). Therefore these heads suffer from the disadvantage of having a high inductance and are therefore limited in the modulation frequency and therefore in the writing rate. Their considerable size is also accompanied by a considerable weight leading to a not very good access time.

EP-A-492 888 describes a thin film magnetic head comprising a magnetic material substrate in which a recess is formed in order to receive a conductor coil. This coil is flush with the level of the lateral edges and the central pole of the magnetic substrate.

The attached FIG. 1 shows a magnetic head according to this prior art. The magnetic head substrate is 2. It has a recess between an outer edge 3 and a central pole 4, the latter being surrounded by the coil 5. The assembly is placed upstream of a support 6 coated with a recording coating 7. The magnetic field lines are 8. They intersect the recording coating 7 in a relatively wide area, but it is essentially the area facing the pole 4 which is subject to writing, the field rapidly becoming very weak on moving away from it. Moreover, the writing or overwriting area is more specifically defined by a laser beam 9, which strikes a very narrow portion of the coating 7, where it is wished to write a data element.

This type of head suffers from disadvantages. The dissipation of the heat given off by the coil is not very adequate. In the case of a flight or movement accident, when the head collapses or crashes on the coating 7, the winding 5 could be seriously damaged. Moreover, such a head has a significant weight due to the nature of the substrate (made from a ferrite such as nickel-zinc ferrite), which reduces the access time. Finally, the production process of such a head with the machining of its substrate is not very appropriate for mass production, so that the head price is high.

The aim of the present invention is to obviate these disadvantages.

SUMMARY OF THE INVENTION

According to the invention, the magnetic head is produced on a silicon substrate, which makes it possible to use microelectronics technology and in particular a collective production, whilst bringing about a good dissipation of the heat given off by the coil. This coil is constituted by one or more conductor levels spirally wound by at least ten turns, each turn being located in a plane parallel to the substrate. The resulting coil with an internal radius of approximately 20 to 100 µm and an external radius of approximately 100 µm to 1 mm, makes it possible to create on its axis a magnetic field with a significant perpendicular component.

A magnetic circuit can assist the amplification of this writing field. This magnetic circuit can be limited to a thin magnetic film with a uniform thickness (approximately 4 µm), which can be very easily produced in microelectronics technology. In the aforementioned EP-A-492 888, the magnetic pole also helps to increase the field in the centre of the head, but the simulation results obtained by the applicant show that the influence of said pole at a considerable distance becomes negligible and that it is preferable to limit to a constant thickness magnetic sheet (e.g. of FeNi or Sendust). This gives a simpler production process with better performance characteristics, which are almost as good for a head moving at a significant distance from the disk (approximately 5 µm).

As the head according to the invention is intended to operate with very short times, i.e. at high frequency (up to several dozen MHz), induced currents may appear in the magnetic circuit. These currents can have a detrimental effect on the useful magnetic field created by the head. They can be eliminated by making in particular radial slots or grooves in the plane of the disk. These grooves completely traverse the magnetic circuit and subdivide the latter into electrically isolated sectors without disturbing the passage of the magnetic field.

The electrical connections can be made through the silicon substrate (intraconnections). For a single turn conductor, one or two intraconnections are adequate. The current arrives by an intraconnection connected to a conductor stud connected to the outer turn and leaves either by a second intraconnection traversing the substrate and connected to another stud located within the turn, or by the silicon substrate connected by a connection to a stud connected to the inner end of the conductor turn.

The heads according to the invention can be produced collectively in a silicon substrate. The thus constituted assembly is cut into sliders, able to move or fly on the rotating disk, in the same way as conventional heads on a hard magnetic disk. After cutting, each slider can be profiled with rails, indentations, etc.

The coil creating the magnetic field is set back with respect to the bearing surface of the flight slider (or flight/movement plane), so as to protect it from a flight or movement accident (collapse or crashing of the slider on the disk).

This coil can be produced in a recess between two supporting surfaces or can be buried beneath a non-magnetic, protective coating deposited on the substrate before cutting.

The distance between the movement plane closest to the disk and the plane of the coil can be about 10 micrometers.

An approximately 4×3×0.5 mm or 3×2×0.5 mm slider mounted on an appropriate spring (force of 1 to a few gf) can fly or move at several micrometers above the disk.

As a result of the silicon substrate, the head according to the invention can be produced with existing microelectronics equipment, which allows a low cost, mass production. Moreover, the small size attainable with this technology gives such heads a limited weight, which is advantageous for having a reduced access or retrieval time, as well as a low inductance, which makes it possible to vary the field with a very high frequency to obtain very high information densities.

In addition, silicon has good heat conducting properties, ensuring a correct cooling of the operating head.

The horizontal structure of the head with the plane of the coil parallel to the plane of the disk is of an optimum nature for creating a perpendicular field in the active coating thereof.

Unlike in the case of recording heads for hard magnetic disks, which must move as close as possible to the disk, the magnetic head according to the invention creates a field at a great distance and which is significantly broadened, which makes it possible to bury said head below a protective coating having a thickness of a few to about 10 microns or set it back with respect to the movement plane of the head. This leads to two major advantages, on the one hand the head is well protected in the case of a sudden or abrupt landing of the slider on the disk (due to a current breakdown or a shock) and on the other, even if the slider lands on a disk not having a protective coating, the magnetic field created on the disk will be less significant than if the surface of the head was in contact with the latter. Thus, there is no risk of erasing the recorded information (on exceeding the coercive field of the magnetooptical material), other than at the location heated by the laser.

Another advantage linked with the significantly broadened field is that it is possible to make the slider move at a considerable height above the disk (a few to about a dozen micrometers), which means that any dust present on the disk surface is not prejudicial.

The magnetic circuit, although not absolutely indispensable, makes it possible to improve the efficiency of the head by reducing the current necessary for creating a given field on the disk.

DETAILED DESCRIPTION OF AN EMBODIMENT

Figure 2:
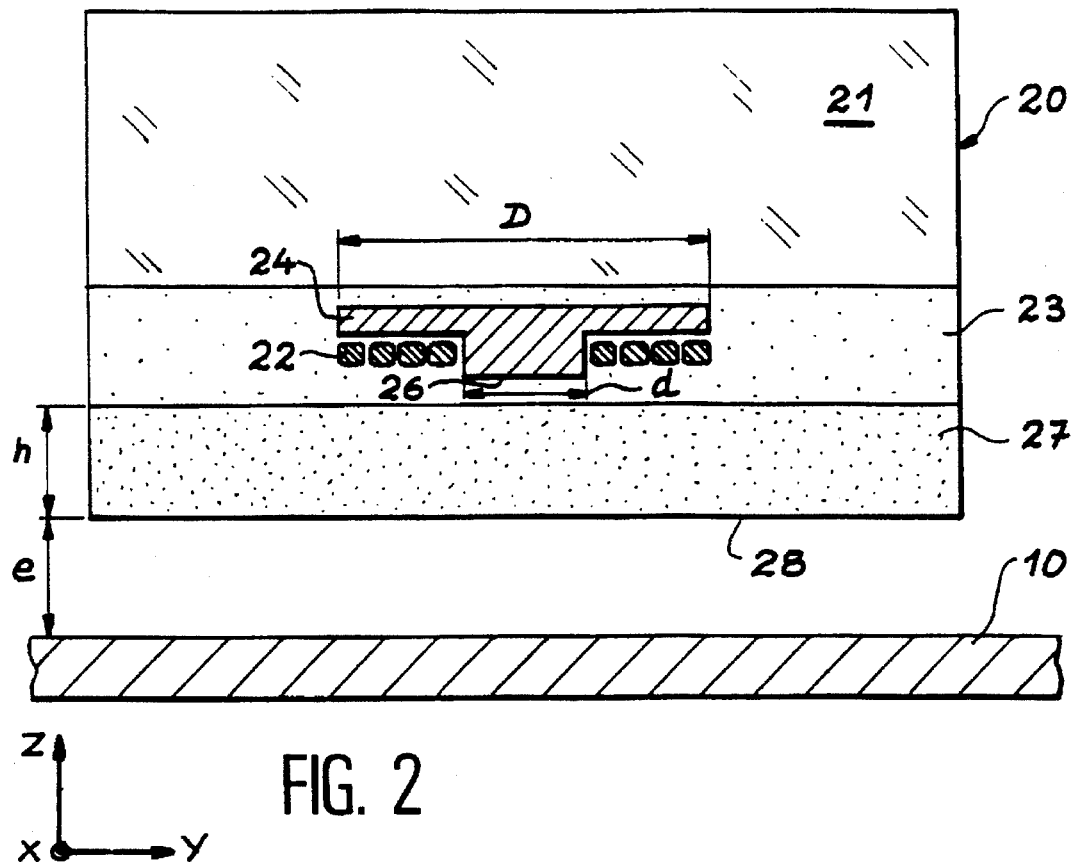
FIG. 2, in section, shows a magnetic head according to the invention, with a magnetic circuit having a central pole.

FIG. 2 shows in section a magnetooptical recording support 10, whose rotation speed is directed perpendicular to the plane of the drawing. A magnetic head 20 comprises a silicon substrate 21, covered by an insulating layer 23, e.g. of silicon dioxide $SiO_2$, in which is buried a coil 22. In the illustrated variant, in the insulant 23 is also buried a magnetic circuit 24 in the form of e.g. a thin disk, with a central pole 26, the coil 22 completely surrounding said pole. The head is completed by a protective coating 27, e.g. of silicon dioxide, defining a flight or movement plane 28.

For example, it is pointed out that the diameter D of the magnetic circuit 24 can be between 200 µm and 2 mm, the diameter d of the pole 26 is between 40 and 200 μm, the thickness h of the protective coating 27 can be approximately 5 μm as well as the distance e between the flight plane 28 and the recording support 10.

Figure 3:
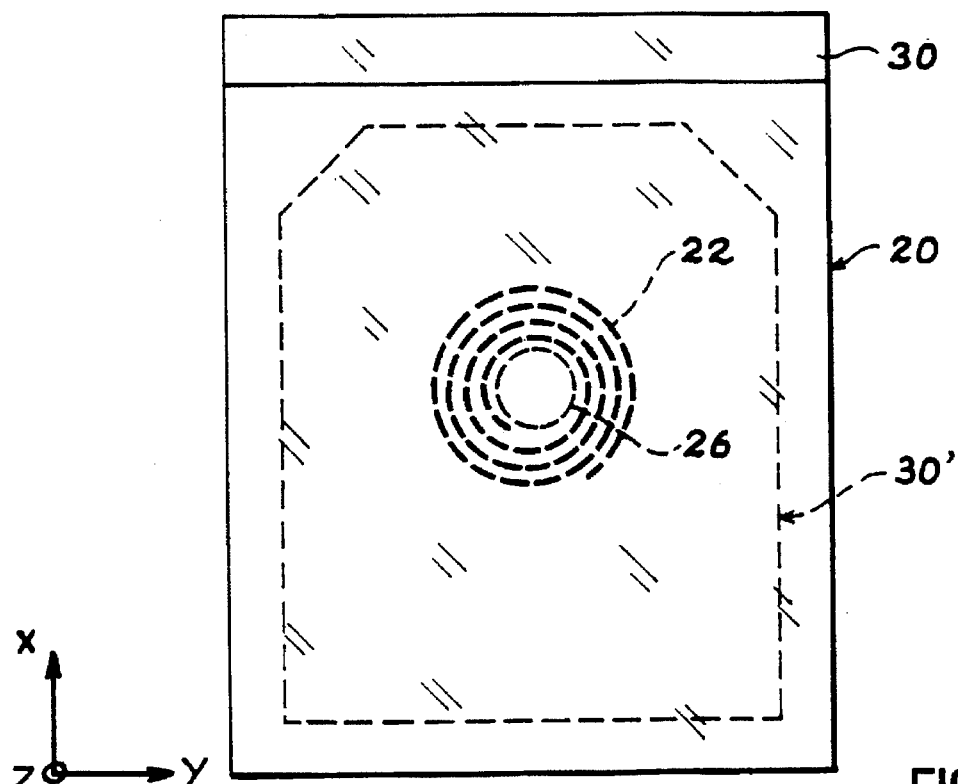
FIG. 3 shows the same head viewed from below.

FIG. 3 shows the head in a view from below with its coil 22 and the pole 26. The flight slider is assumed to have over all or part of its surface a chamfer or indentation 30 (or 30' along the broken line), using a known procedure in connection with such sliders for magnetic recording in order to improve the characteristics of the flight or movement of the slider.

Figure 4:
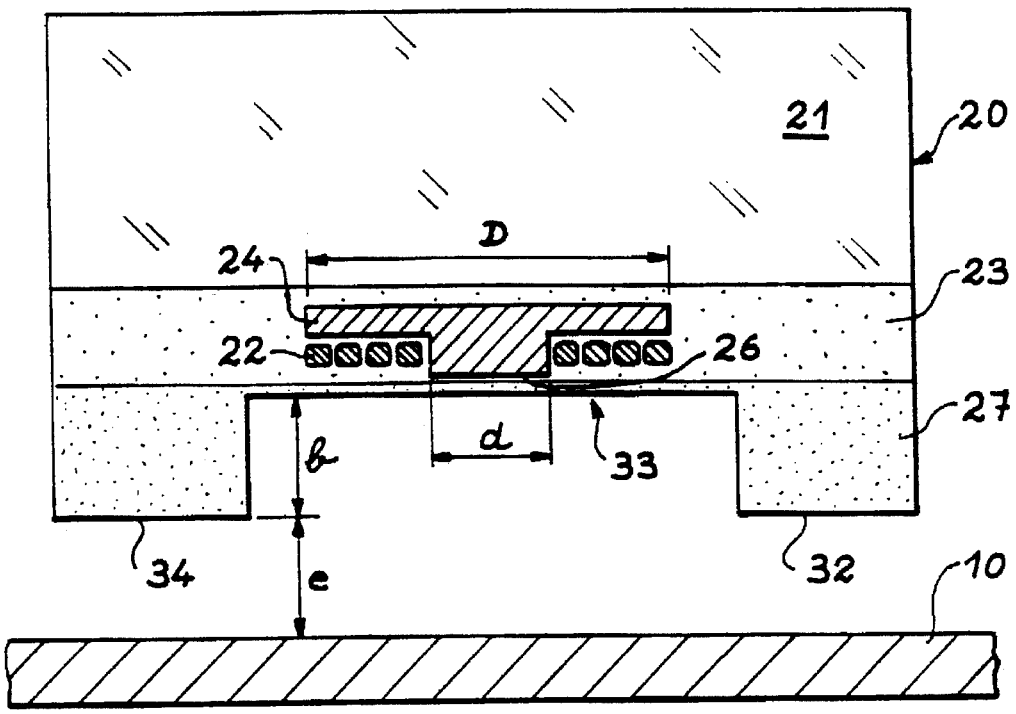
FIG. 4 illustrates in section a catamaran-type variant.

FIG. 4 illustrates another embodiment with a protective coating etched in order to form a catamaran-shaped slider. Two flight skis 32 and 34 are separated by a recess with a height b of approximately 5 μm. The common references with FIG. 2 designate the same elements.

Figure 5:
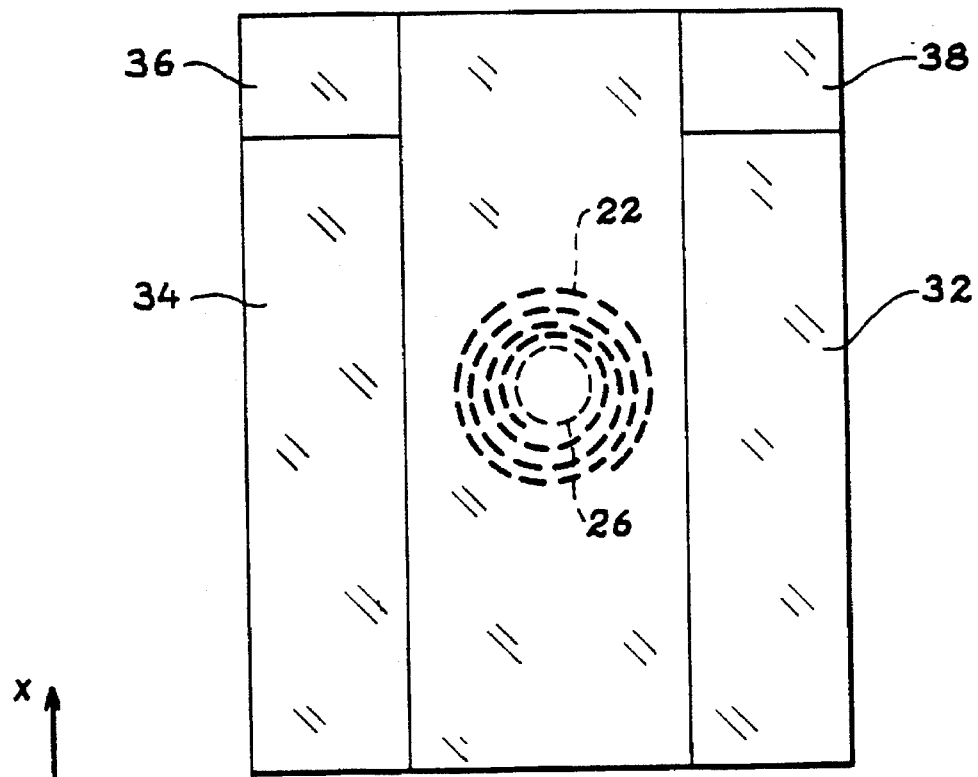
FIG. 5 shows the same variant in a view from below.

FIG. 5 shows the same head in a view from below. At the front, the flight skis 32, 34 have a chamfer or indentation 36, 38. In this variant, a chamfer and/or indentation can also be made on all or part of the outer edges of the rails.

Figure 1:
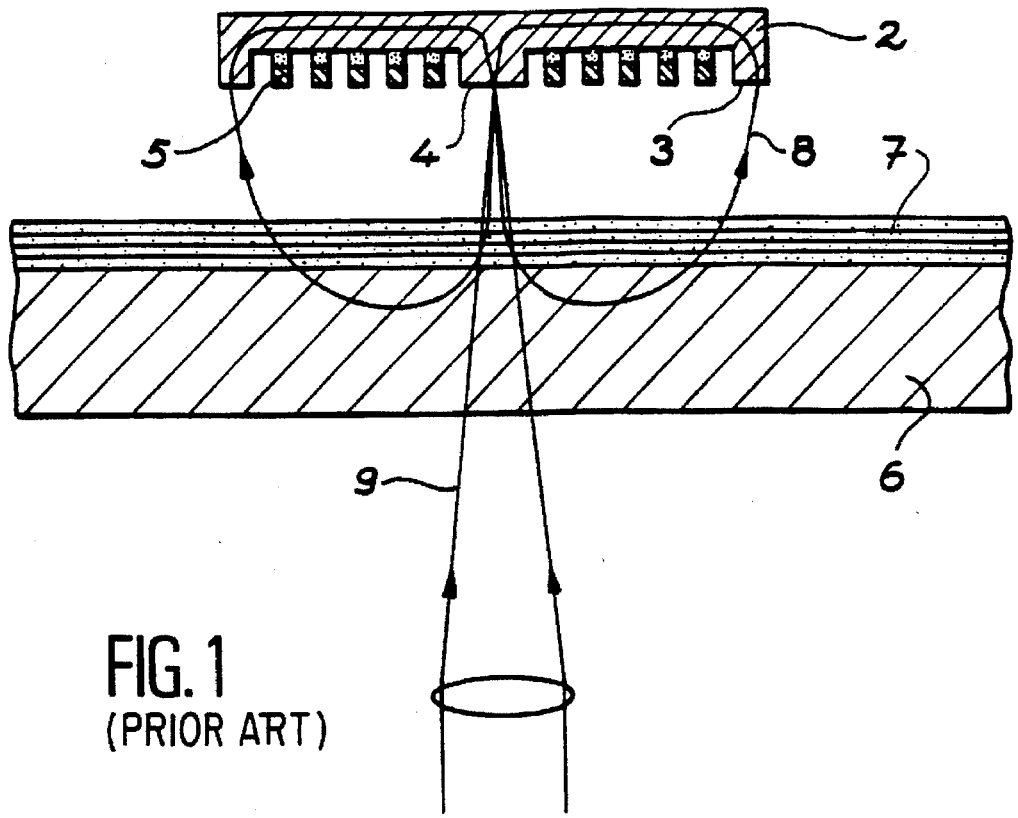
FIG. 1, already described, shows a prior art magnetic head.
Figure 6:
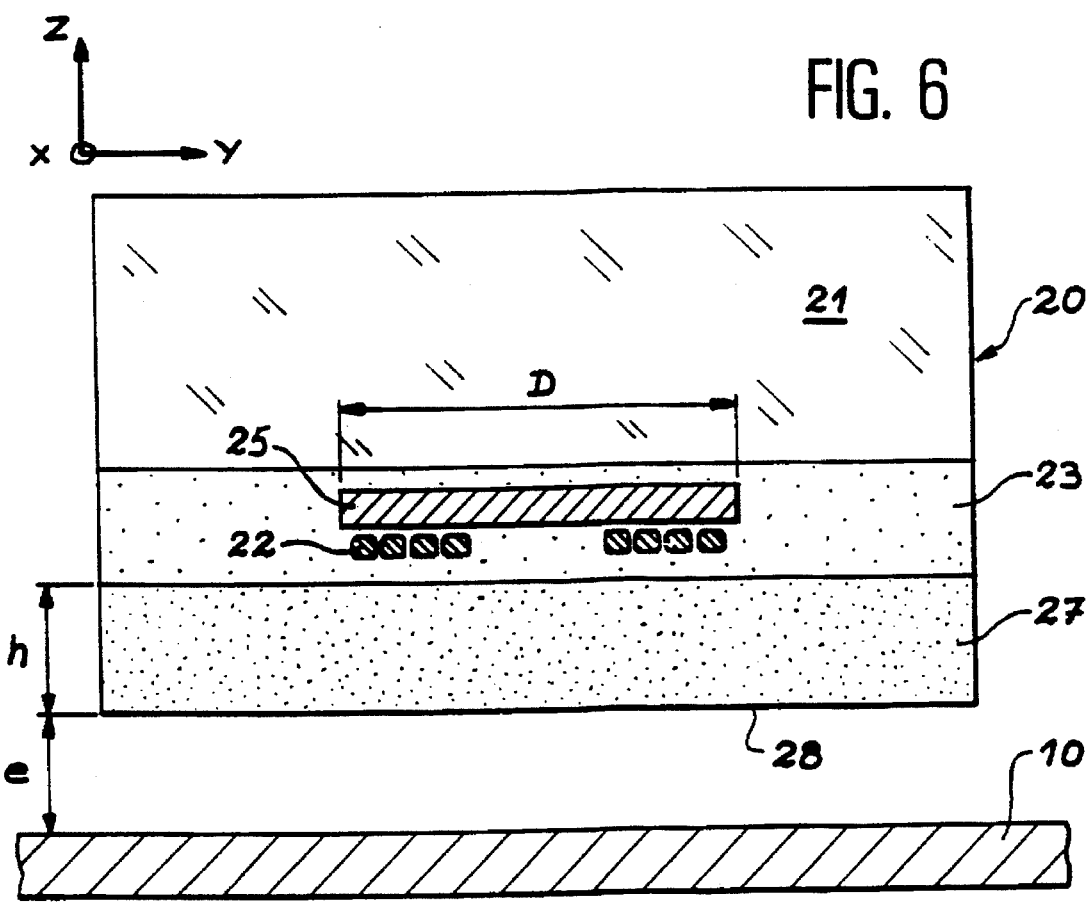
FIG. 6 illustrates another variant with a simplified magnetic circuit.

FIG. 6 shows another variant with a magnetic circuit 25 without a central pole. This circuit is then simply formed by a thin disk-like magnetic coating.

Figure 7:
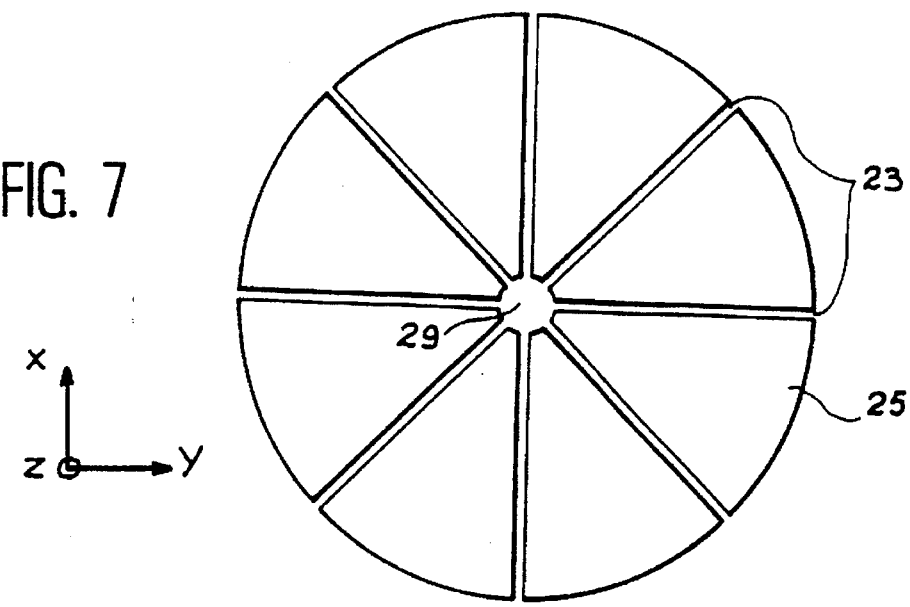
FIG. 7 is a plan view of a grooved magnetic circuit with a passage hole for the intraconnection.

FIG. 7 shows an embodiment of the disk 25, with radial, isolating grooves 23, in order to reduce the induced currents. The disk also has a central opening 29 for the passage of an intraconnection. Grooves can also be made in a magnetic circuit 24 having a central pole.

Figure 8A:
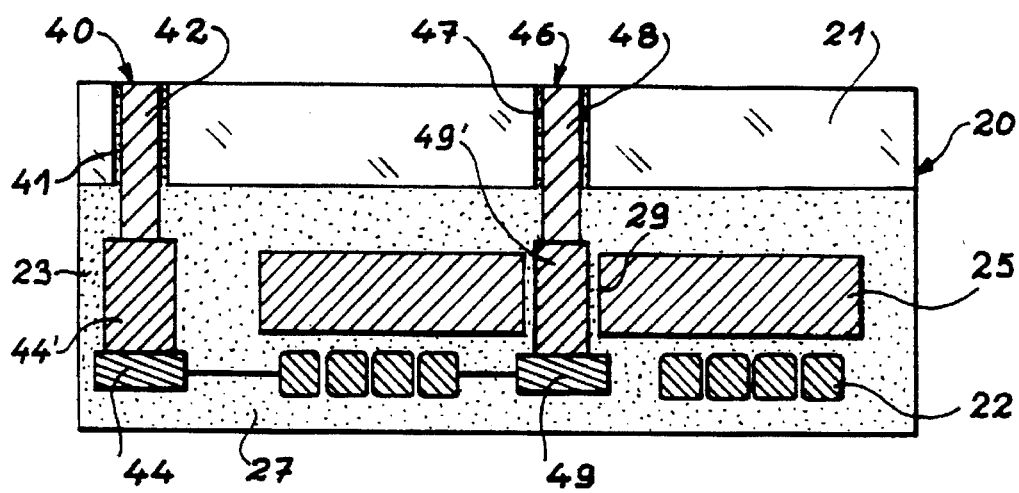
FIGS. 8A and 8B, in section, illustrate two embodiments of intraconnections.

FIG. 8A shows a detail of the intraconnections in a special embodiment. An intraconnection 40 on the side of the head has an opening, e.g. made by laser drilling in silicon, said opening being surrounded by an insulating layer 41, e.g. obtained by anodic oxidation. The opening is then filled with a conductive material 42, e.g. a PbSn paste. The second intraconnection 46 is placed in the centre of the head and passes through the magnetic circuit 25 by the central opening 29. Like the first, said second intraconnection has an insulating layer 47 and a conductive core 48.

The intraconnections 40 and 46 lead to two connection studs 44 and 49 by means of conductors 44' and 49' traversing the insulating layer 23. The first is connected to the outer turn of the coil 22 and the second to the inner turn.

Figure 8B:
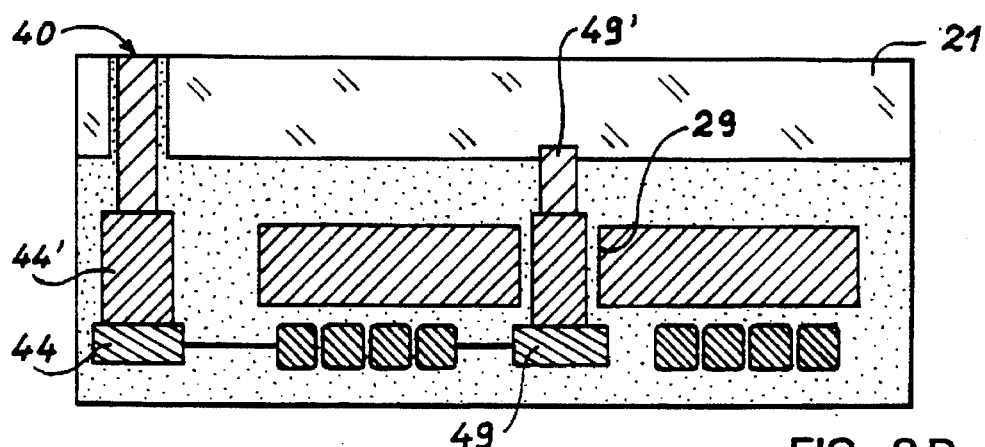

In FIG. 8B, the intraconnection 40 has the same structure as in FIG. 8A, but the second Intraconnection is simplified. It once again has the stud 49 and conductor 49', but the latter is in contact with the semiconductor substrate 21 making it possible to establish the electrical connection.

Figure 9A:
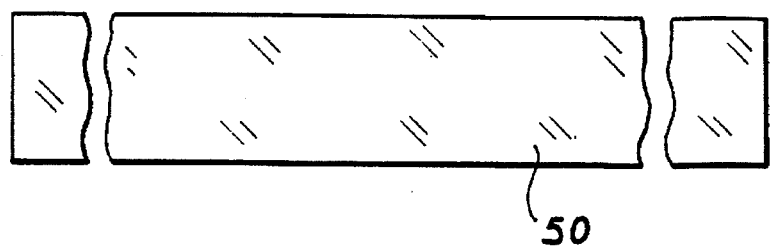
FIGS. 9A and 9B illustrate various stages in the production process of the head according to the invention.
Figure 9B:
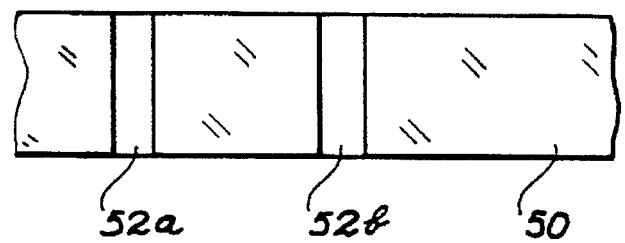
Figure 9C:
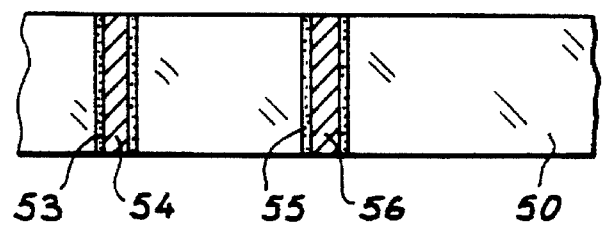
Figure 9D:
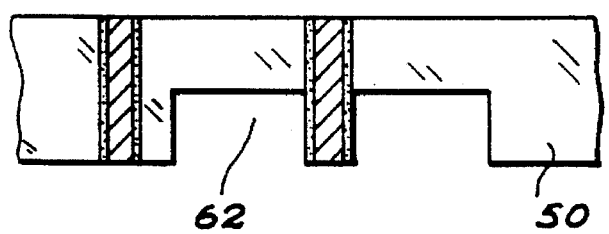
Figure 9E:
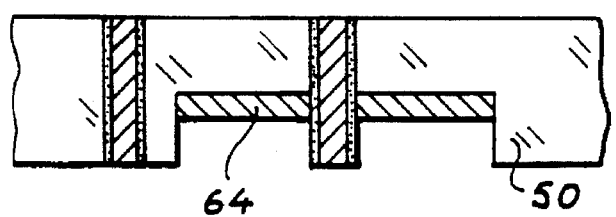
Figure 9F:
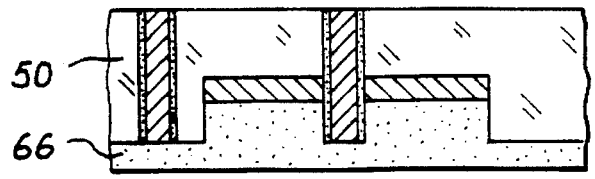
Figure 9G:
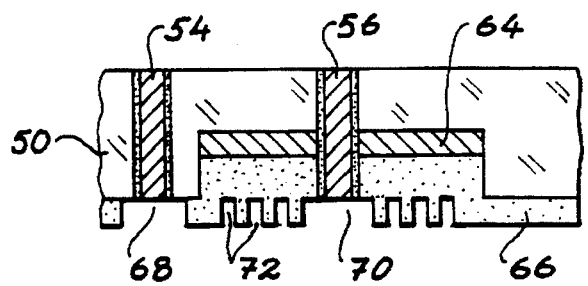
Figure 9H:
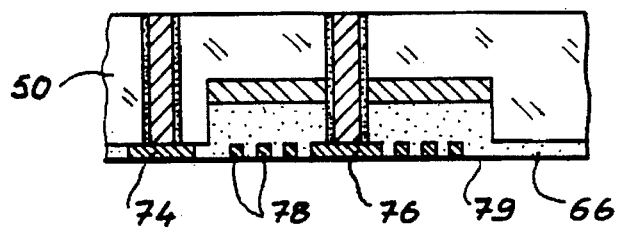
Figure 9I:
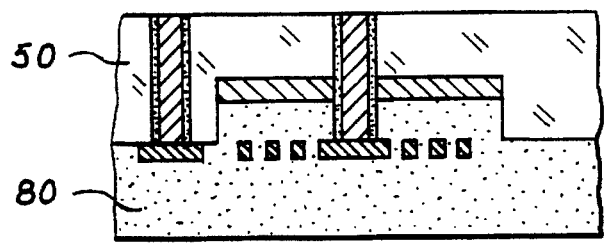
Figure 9J:
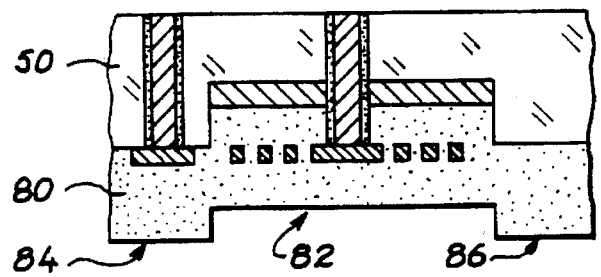

FIGS. 9A and 9B illustrate in exemplified manner a process for the collective production of the heads. This process comprises stages a to e of FIG. 9A:

a) the starting product is a silicon wafer 50 with adequate dimensions for producing a plurality of heads,
b) said wafer is perforated by two openings 52a, 52b, e.g. using a laser and at each location of the future intraconnections of a head,
c) thermal oxidation is used for forming oxide sheaths 53, 55 in the openings and said openings are filled with a conductive paste 54, 56, e.g. of PbSn,
d) the substrate is etched to form a recess 62,
e) a magnetic material coating 64 (e.g. of FeNi) is deposited by electrolysis or sputtering (in this case the operation being followed by etching).

The process is continued by operations f to j illustrated in FIG. 9B:

f) an insulating layer 66, e.g. of $SiO_2$ is deposited,
g) the layer 66 is etched to form openings 68, 70 facing intraconnections 54, 56 and a spiral 72,
h) a conductive material is deposited at the bottom of the openings 68, 70 and the etched spiral in order to form two intraconnection studs 74, 76 and a coil 78, with the not shown, corresponding connections between the studs and the turns, whereby the conductor can be made from copper and deposition can take place by electrolysis or sputtering followed by etching and/or planarization of the surface 79,
i) a protective coating 80, e.g. of $SiO_2$ is deposited and serves as the carrying surface or flight plane,
j) the coating 80 is etched in order to define the flight surface (here flight skis 84, 86).

These operations can be performed collectively on the basis of a silicon wafer. Connection studs can be made and connected to the intraconnections on the face of the substrate opposite to that where the magnetic heads have been made. It is then necessary to cut the wafer in accordance with cutting lines passing between the different heads in order to obtain the individual heads. It is optionally possible to machine the flight sliders to improve their performance characteristics (machining chamfers, polishing edges, etc.).

Figure 10A:
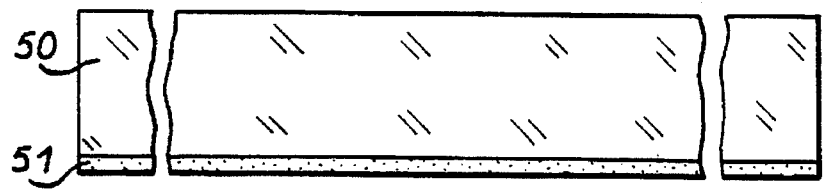
FIGS. 10A and 10B illustrate another head production process.
Figure 10B:
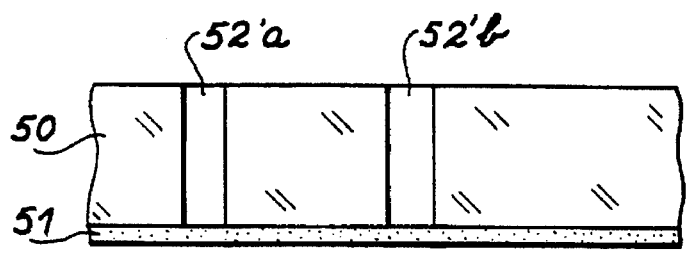
Figure 10C:
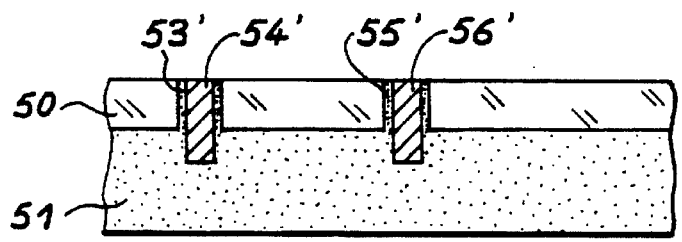
Figure 10D:
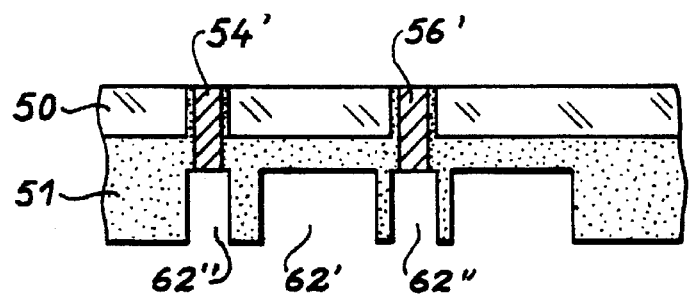
Figure 10E:
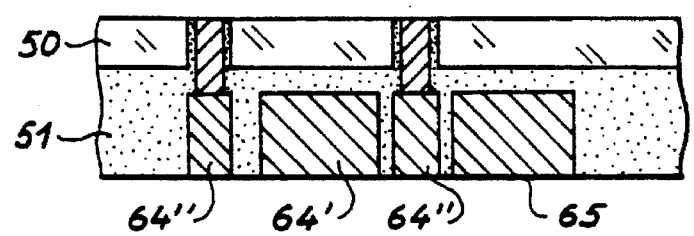
Figure 10F:
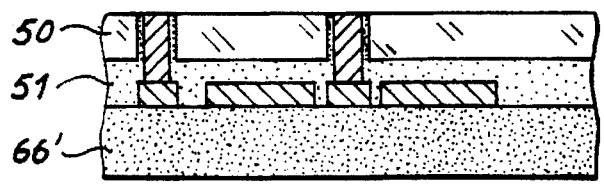
Figure 10G:
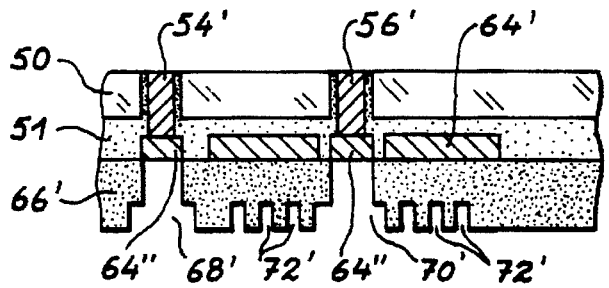
Figure 10H:
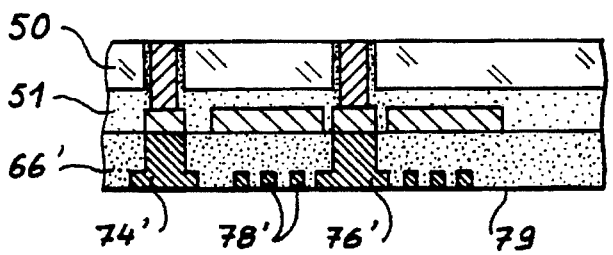
Figure 10I:
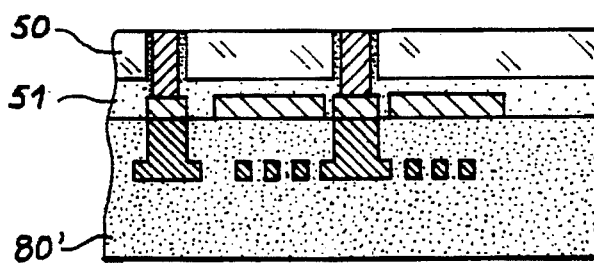
Figure 10J:
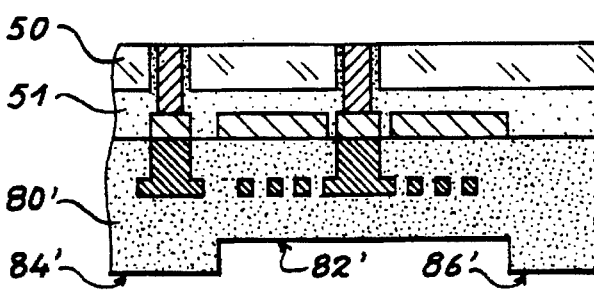

In the form of a second example of a non-limitative nature, FIGS. 10A and 10B illustrate a collective head production process, which once again has stages a to e of FIG. 10A:

a) the starting product is a silicon wafer 50 with a sufficient size to produce a plurality of heads and is covered with a silicon dioxide layer 51,
b) in said wafer are made two non-issuing openings 52a', 52b', e.g. using a laser, at each location of the future intraconnections of a head,
c) thermal oxidation is carried out in order to form the oxide sheaths 53' and 55' in the openings and in order to raise the $Si/SiO_2$ interface and these openings are filled with a conductive paste 54', 56', e.g. of PbSn,
d) the surface oxide 51 is etched to form a recess 62' and two openings 62" facing the intraconnections 54' and 56',
e) a magnetic material coating 64' and 64" (e.g. of FeNi) is deposited by electrolysis or sputtering (in this case the operation is followed by etching) and then the surface 65 is planarized.

The process is then continued by operations f to J illustrated in FIG. 10B:

f) an insulating layer 66', e.g. of $SiO_2$ is deposited,
g) the layer 66' is etched to form the openings 68', 70' facing the deposits 64" and a spiral 72',
h) a conductive material is deposited at the bottom of the openings 68', 70' and the etched spiral, in order to form two intraconnection studs 74', 76' and a coil 78' with the corresponding, not shown connections between the studs and the turns, whereby the conductor can be of copper and deposition can take place by electrolysis or sputtering followed by etching and/or a planarization of the surface 79',
i) a protective coating 80', e.g. of $SiO_2$ is deposited and serves as the carrying surface or flight plane,
j) the coating 80' is etched to define the flight surface (here flight skis 84', 86').

As for the embodiment of FIGS. 9A and 9B, these operations can be performed collectively on the basis of a silicon wafer. Connection studs can be made and connected to the intraconnections on the face of the substrate opposite to that where the magnetic heads have been made. It is then necessary to cut the wafer along cutting lines passing between the different heads in order to obtain the individual heads. It is optionally possible to machine the flight sliders to improve their performance characteristics (machining of chamfers, polishing edges, etc.).

The magnetic heads described hereinbefore can be used as components in a magneto-optical reading/recording system with direct overwriting functioning by magnetic field modulation, optionally coupled with laser beam modulation. The modulation of the magnetic field is obtained by modulating the current injected into the magnetic head.

The main applications of such a system are in the following fields:

data networks, work stations, microcomputers:
for storing data and user software on removable disks,
for the use of software marketed on removable disks,
for filing data on multidisk systems, optionally provided with disk changers;
audio, video, general public multimedia:
improved performance characteristics SONY Mini-Disc-type audio recorder,
video recorder (replacing video tape recorders),
photographic recorders: the photographs can be made and displayed directly on the apparatus and then erased if not suitable, thus freeing space for new, successful photographs,
multimedia recorders: images, sound, software for games or general public applications (e.g. domotic or linguistic) and their data.

We claim:

1. A magnetic writing head for magnetooptical recording comprising:

a semiconductor substrate made of silicon and having a major surface;

an insulating layer formed on the major surface of the semiconductor substrate;

a coil embedded in the insulating layer for generating a magnetic field in the vicinity of a recording medium;

a magnetic material circuit embedded in the insulating material between the semiconductor substrate and the protective coating, said magnetic material circuit having a magnetic pole at its center which is surrounded by the coil;

a protective coating layered on the insulating layer having at least a 5 µm thickness between a surface facing the recording medium and the insulating layer for protecting the magnetic coil from damage in a case where the magnetic writing head crashes onto the recording medium; and wherein, the coil is set back with respect to the recording medium by positioning the magnetic writing head away from the recording medium, defined by a distance between the protective coating and the recording medium, at least 5 µm.

2. The magnetic head according to claim 1, further comprising:

radial-isolating grooves formed in a surface of the magnetic material circuit facing the semiconductor substrate for electrically isolating the magnetic circuit material into sectors without disturbing the passage of the magnetic field for preventing electric currents appearing in the magnetic circuit induced by high frequency operation of the magnetic circuit material.

3. The magnetic head according to claim 1, further comprising:

a flight slider formed in the surface of the protective coating layer for forming air pressure below the magnetic head and causing the magnetic head to be suspended above the recording medium.

4. The magnetic head according to claim 1, wherein the flight slider further comprises:

two flight skis separated by a set back area for forming a catamaran-like flight slider, said flight skis forming a majority of said air pressure beneath the magnetic head for suspending the magnetic head above the recording medium.

5. The magnetic head according to claim 4, wherein the coil is positioned within the insulating material adjacent the set back area and having a center which is equidistant from the two flight skis.

6. The magnetic head according to claim 5, wherein the slider is formed out of the protective coating layer and defines a flight plane.

7. The magnetic head according to claim 6, wherein the protective coating layer is etched to form the slider.

8. The magnetic head according to claim 4, wherein the protective coating layer, slider and two flight skis separated by a set back area are formed integrally with the magnetic head as a semiconductor.

9. The magnetic head according to claim 1, wherein the magnetic material circuit includes an opening formed therethrough at a center and said intraconnection leading to the center of the coil passes therethrough.

10. The magnetic head according to claim 1, wherein the insulating layer further comprises:

a supplementary insulating layer deposited on the silicon substrate and the magnetic material circuit is deposited on said supplementary insulating layer, said insulating layer formed on the supplementary insulating layer and the magnetic material circuit to embed the magnetic material circuit within an insulating material.

11. The magnetic head according to claim 1, wherein an outer diameter of the magnetic coil is in a range between 200 µm and 2 mm and an inner diameter of the magnetic coil is in a range between 40 µm to 200 µm for providing a sufficient magnetic field in the area of the recording medium below the magnetic head at a distance of at least 10 µm defined by a distance from the protective coating to the recording medium.

* * * * *

UNITED STATES PATENT AND TRADEMARK OFFICE
CERTIFICATE OF CORRECTION

PATENT NO. : 5,642,336
DATED : JUNE 24, 1997
INVENTOR(S) : ALBERTINI ET AL

It is certified that error appears in the above-identified patent and that said Letters Patent is hereby corrected as shown below:

Column 4, line 48, change "Figs. 9A and 9B" to --Figs. 9A-9E and 9F-9J--;

line 50, change "Figs. 10A and 10B" to --Figs. 10A-10E and 10F-10J--.

Column 5, line 48, change "Figs. 9A and 9B" to --Figs. 9A-9E and 9F-9J--;

line 50, change "a to e of Fig. 9A" to --of Figs. 9A-9E--;

lines 63-64, change "f to j illustrated in Fig. 9B" to --illustrated in Figs. 9F-9J--.

Column 6, line 21, change "Figs. 10A and 10B" to Figs. 10A-10E and 10F-10J--;

lines 22-23, change "a to e of Fig. 10A" to --of Figs. 10A-10E--;

lines 40-41, change "f to j illustrated in Fig. 10B" to --illustrated in Figs. 10F-10J--;

line 56 change "Figs. 9A and 9B" to --Figs. 9A-9E and 9F-9J--.

Signed and Sealed this

Ninth Day of June, 1998

*Attest:*

BRUCE LEHMAN

*Attesting Officer*  *Commissioner of Patents and Trademarks*